(No Model.) 6 Sheets—Sheet 1.

F. H. BULLIS.
LOCK.

No. 555,360. Patented Feb. 25, 1896.

WITNESSES:
William P. Goebel.
J. S. Taplinger INVENTOR
F. H. Bullis
BY
Munn & Co
ATTORNEYS.

(No Model.)  
F. H. BULLIS.  
LOCK.  
No. 555,360.  
6 Sheets—Sheet 4.  
Patented Feb. 25, 1896.

WITNESSES:  
William P. Gaebel.  
J. S. Caplinger.

INVENTOR  
F. H. Bullis  
BY Munn & Co  
ATTORNEYS.

(No Model.) 6 Sheets—Sheet 5.
F. H. BULLIS.
LOCK.

No. 555,360. Patented Feb. 25, 1896.

WITNESSES:
INVENTOR
BY
ATTORNEYS.

(No Model.) 6 Sheets—Sheet 6.

F. H. BULLIS.
LOCK.

No. 555,360. Patented Feb. 25, 1896.

WITNESSES:
William P. Gaebel
John Lotka

INVENTOR
F. H. Bullis
BY Munn & Co
ATTORNEYS.

UNITED STATES PATENT OFFICE.

FRANKLIN HOWARD BULLIS, OF BROOKLYN, NEW YORK.

LOCK.

SPECIFICATION forming part of Letters Patent No. 555,360, dated February 25, 1896.

Application filed June 20, 1895. Serial No. 553,491. (No model.)

*To all whom it may concern:*

Be it known that I, FRANKLIN HOWARD BULLIS, of Brooklyn, in the county of Kings and State of New York, have invented certain new and useful Improvements in Locks, of which the following is a full, clear, and exact description.

This invention relates to certain improvements in locks, such as are adapted to be employed for raising and lowering vessels passing along canals, rivers, &c., and has for its object to provide a lock of a new and improved construction, such that in passing therethrough the speed of the vessel need be but slightly or not at all retarded, whereby time and labor are saved, and whereby such locks may be applied for use at the entrance to seaport-harbors to deepen the waters thereof and thereby improve and facilitate transportation.

The invention contemplates certain novel features of the construction, combination, and arrangement of the various parts of the improved lock, whereby certain important advantages are attained and the device is rendered simpler, less expensive, and otherwise better adapted and more convenient for use than various other similar devices heretofore employed, all as will be hereinafter fully set forth.

The novel features of the invention will be carefully defined in the claims.

Reference is to be had to the accompanying drawings, forming a part of this specification, in which similar characters of reference indicate corresponding parts in all the figures.

Figure 1:
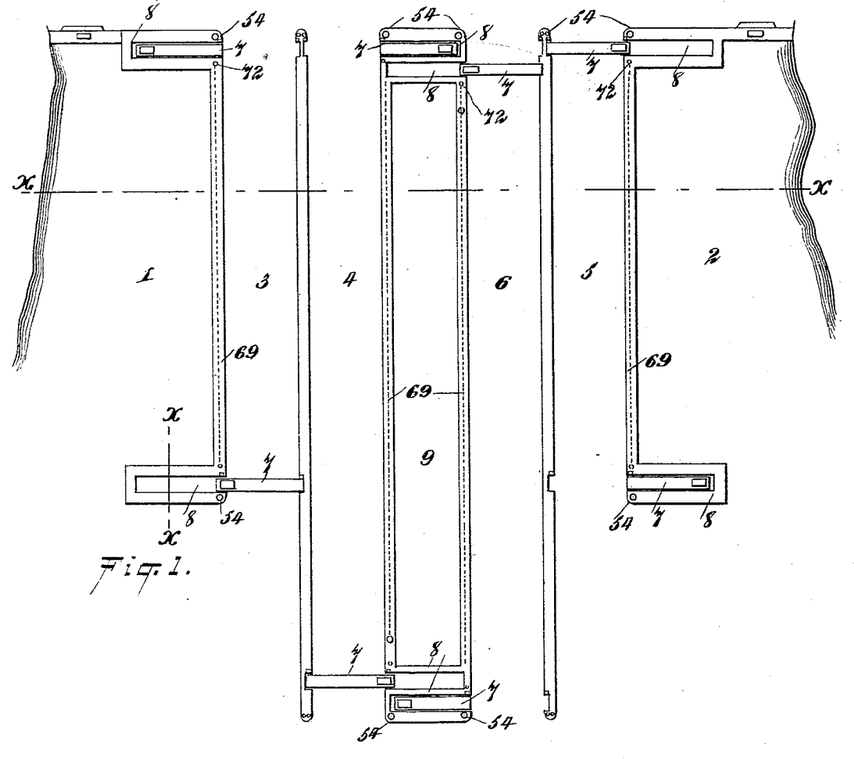
Figure 1 is a general plan view showing one arrangement of the lock constructed according to my invention.
Figure 2:
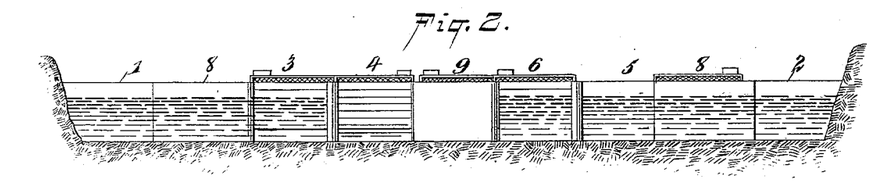
Fig. 2 is an end view of the same.

Fig. 1 shows the application of my improved locks to the entrance to a seaport-harbor. In this view 1 and 2 represent dykes or embankments at opposite sides of the channel, and 3, 4, 5, and 6 represent the locks, the inner locks 4 and 6 being of greater length than the outer locks, and being thereby adapted for the passage through them of vessels of greater length than the shorter outer locks 3 and 5. Each of said locks has at each end a transversely-movable gate 7 arranged when moved out of position to close the lock to be housed or inclosed in a chamber 8 at one side of the lock. The two inner locks 4 and 6 are separated by a water-space 9, at each end of which are formed two such chambers 8, adapted for the reception of the gates 7 at the ends of said inner locks. Each gate consists of a car-like framework arranged to move transversely of the lock or substantially at right angles to the walls thereof, and for this purpose track-rails 11 supported on ties 12 are laid along opposite sides of the bottom of each chamber 8 and across the lock in position to receive track-wheels 13 held on axles 14 at the lower part of the car.

Figure 4:
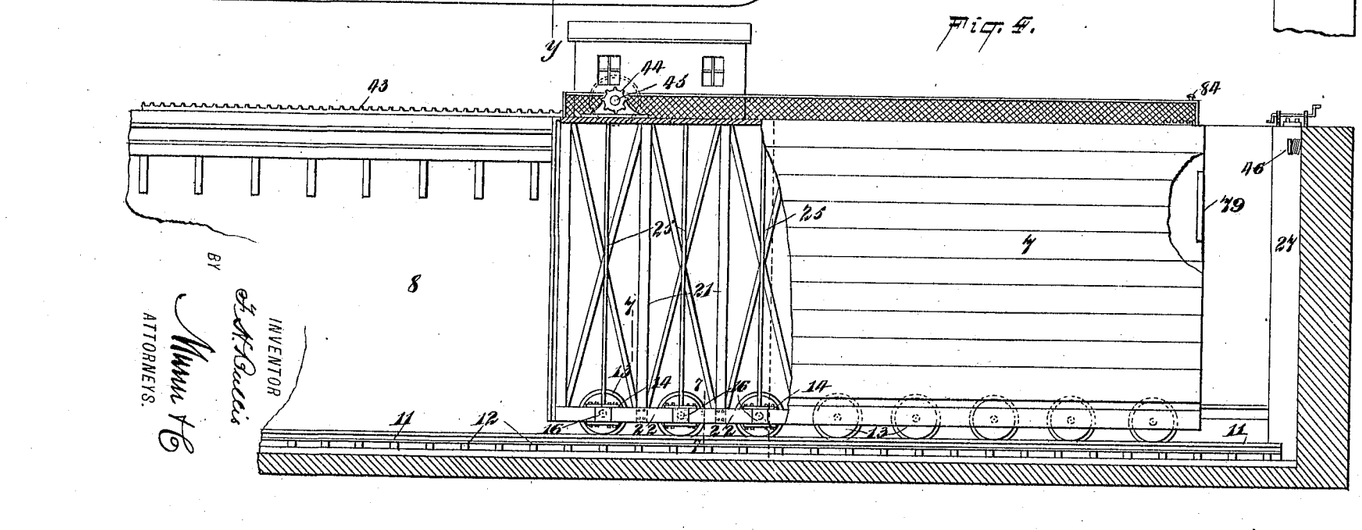
Fig. 4 is a sectional view also drawn to an enlarged scale and taken transversely through the end of the lock in the vertical plane indicated by the line $x\ x$ in Fig. 3 and showing the construction of the gate.
Figure 5:
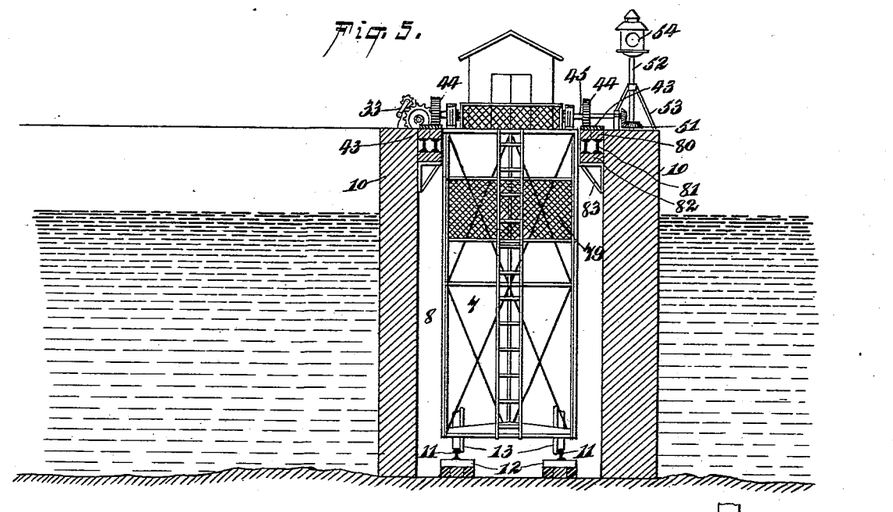
Fig. 5 is a vertical sectional view taken through the gate in the plane indicated by line $y\ y$ in Fig. 3, being at right angles to the plane of the section in Fig. 4.
Figures 6, 7, 8, 9:
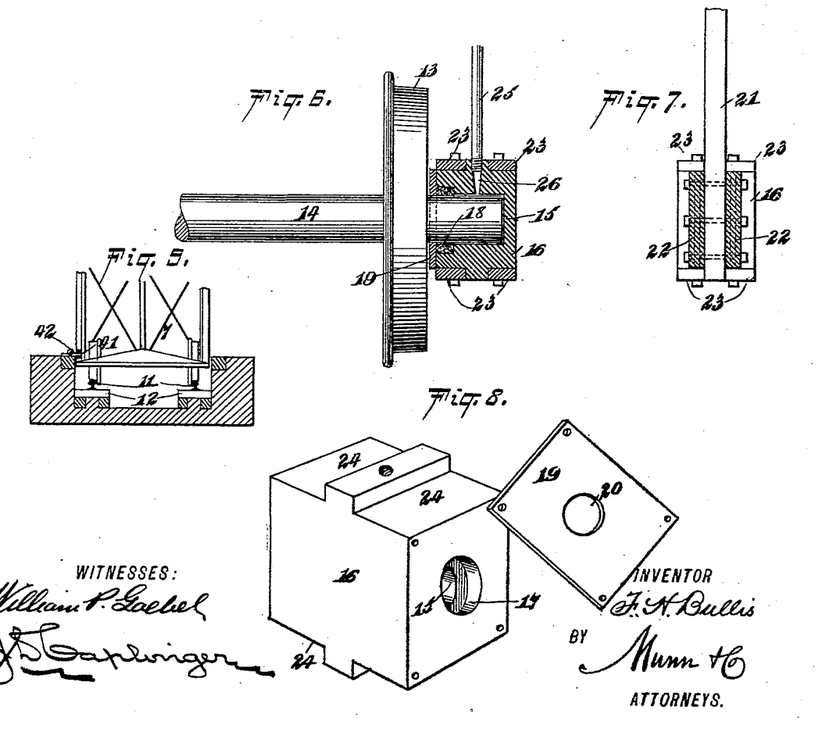
Fig. 6 is a fragmentary detail view drawn to an enlarged scale and showing the axle-box employed for holding the axles whereon the gates are mounted and the means for operating the same.
Fig. 7 is a detail sectional elevation taken on the line 7 7 of Fig. 4.
Fig. 8 is a perspective view showing the construction of the box as shown in Fig. 6.
Fig. 9 is a sectional view taken transversely through the tracks whereon the gate runs.

As shown in Figs. 3 to 8, each axle 14 has its ends arranged to project beyond the wheels 13, and said projecting ends engage bearings 15 formed in boxes 16, each of said bearings having its outer end closed and its inner end enlarged to form a chamber 17 surrounding the axle and adapted to be filled with packing, as seen at 18 in Fig. 6, and said packing is held in place in said chamber by means of a face-plate 19 having a perforation 20 to receive the axle, and held in place on the box 16 by means of bolts or screws, as seen in Fig. 8.

Figure 3:
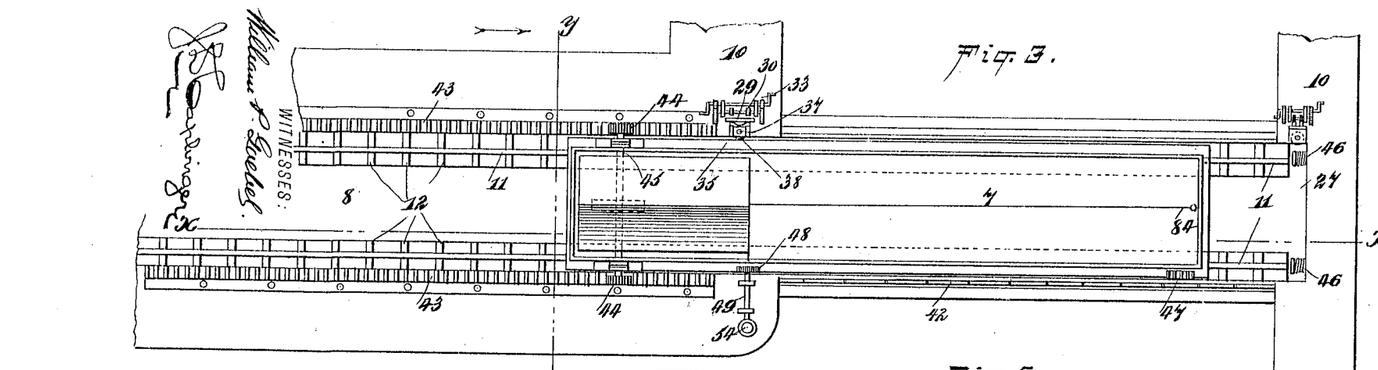
Fig. 3 is a plan view drawn to a larger scale and showing the construction of the gate at the back end of the lock and the devices for operating the same.

The framework of the gate or car 7 comprises vertical studs or beams 21 connected at their top and also at their lower parts by means of beams 22 extending between the boxes 16, as seen in Fig. 4, and secured together by means of metal straps or braces 23 extending over the tops and bottoms of the boxes 16, which are provided at opposite sides of their upper and lower faces with recesses 24 forming seats to receive said straps or braces. The construction of these parts and their arrangement are clearly shown in Figs. 3 to 8.

A series of pipes or tubes 25 extend vertically down from the upper part of the gate or car 7, as seen in Figs. 4 and 6, and each of said pipes communicates at its lower end with an oil-duct 26 leading to the bearing 15 of one of the boxes 16, so that the axles may be conveniently lubricated, and the sides of each gate are boarded over with planks or sheathing of suitable strength, so as to be water-tight.

In order to protect the car or gate 7 against injury by driftwood and the like, I prefer to provide said car at its front or outer end with a guard or screen 79, Figs. 4 and 5, arranged approximately at the height of the normal water-level.

Figures 14, 15, 16:
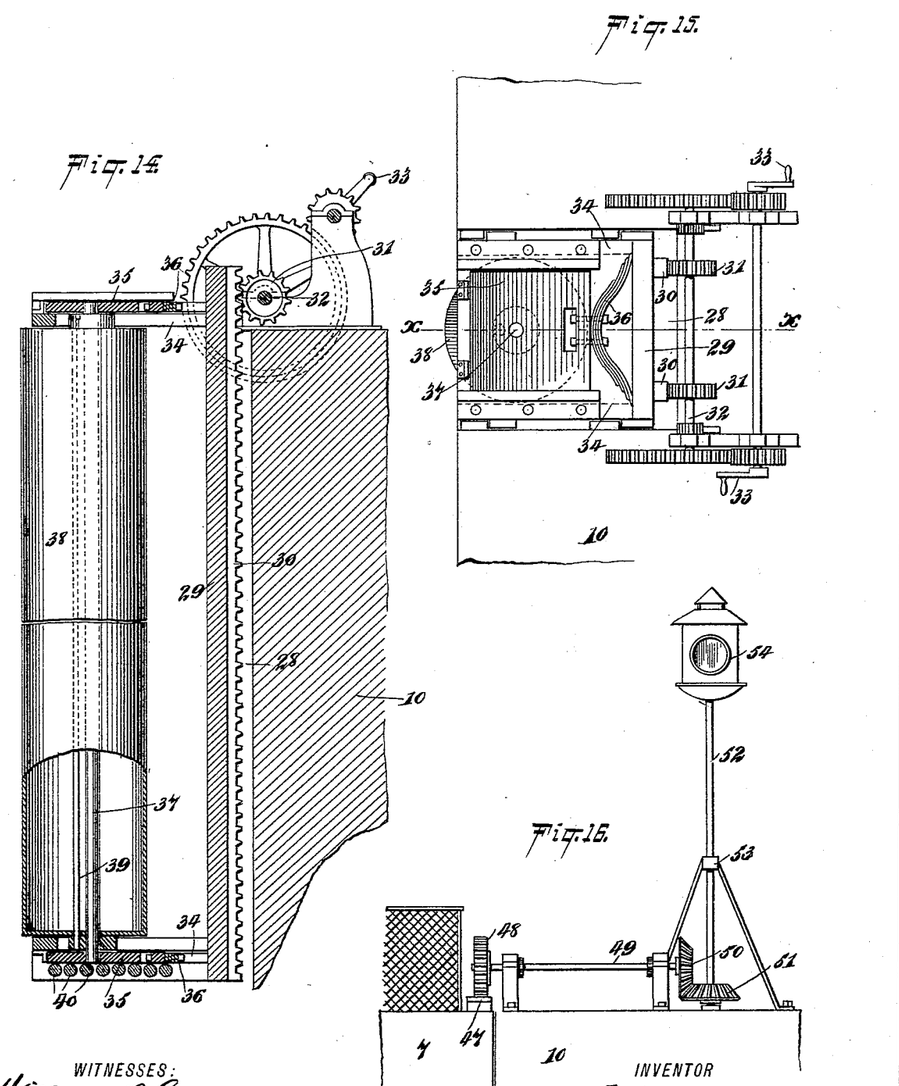
Fig. 14 is a vertical sectional view, taken through the wall of the lock at the end of one of the gates, showing the means employed for packing the joint between the walls of the gate and of the lock.
Fig. 15 is a plan view of the same parts.
Fig. 16 is an enlarged detail view showing the signal device and its operating mechanism.

At the wall 10 of the lock opposite to the chamber 8 is formed a vertical recess 27 of dimensions adapted to receive the end of the gate when in its closed position, and at opposite sides of the lock on the inner side of the gate at the seaport or lower end of the lock and on the outer side of the gate at the upper or high-water end of the lock I employ devices for forming a tight joint between the walls of the lock and the side of the gate or car 7, so as to prevent, as far as possible, the leakage of water at these points. These devices are or may be alike, and are shown in detail in Figs. 14 and 15. As shown, the wall 10 of the lock is recessed, as seen at 28, to receive a vertically-movable frame 29, having on its rear face series of rack-teeth 30 meshing with pinions 31 on the shaft 32 of a windlass arranged to be operated by hand-cranks 33, so that said frame 29 may be conveniently raised and lowered. At top and bottom the frame 29 is provided with guide-arms 34 projecting from opposite sides of its front face, between which arms are arranged to play upper and lower slide-blocks, 35, backed by springs 36 tending to press said blocks normally forward.

In the slide-blocks 35 are journaled the upper and lower ends of a vertical shaft 37, whereon is mounted a hollow roller or drum 38 of suitable material and dimensions and arranged to engage its periphery against the side of the gate or car 7 when the same is moved, as seen in Fig. 3, so as to form a tight joint. The drum and the various parts connected therewith are fitted closely together, so as to prevent the water from passing around behind the drum. An oil pipe or tube 39 extends down through the drum 38, so that the lower bearing thereof may be conveniently lubricated, and under the lower slide-block, 35, is arranged a series of rollers 40, serving to support said slide-block and permit free movement of the same.

The tracks whereon the car or gate 7 runs are preferably sunk below the bottom of the lock, as indicated in Fig. 9, and in order to form a tight joint along the side of the car or gate at the bottom of the same I prefer to provide the inner face of said gate with a longitudinal groove or recess 41, arranged to be engaged by a strip 42 of suitable material hinged to a sill extending across the bottom of the lock, as seen in Fig. 9.

Along opposite sides of the chamber 8 at the top of the lock-wall 10 are arranged parallel racks 43 adapted to be engaged by the teeth of pinions or gears 44 on the ends of the transverse drive-shaft 45 of the car or gate 7, which shaft may be driven from any form of motor carried on said car or gate, as will be readily understood, and on the end wall of chamber 8, as also in the recess 27 in the lock-wall opposite chamber 8 are arranged spring buffers 46 to be engaged by the end of the car or gate to break the impact thereof and prevent injury such as would be likely to result were the car or gate driven forcibly into said recess.

Figure 18:
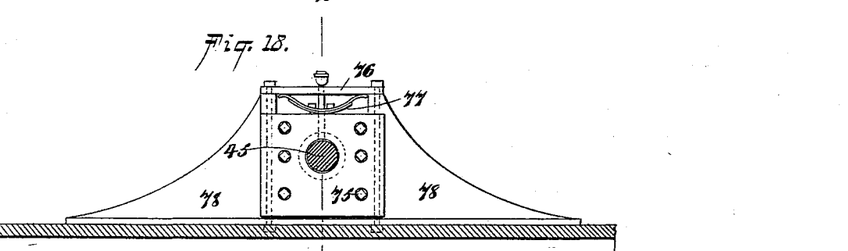
Fig. 18 is a detail cross-sectional elevation of the bearing for the drive-shaft of the gate on line $t\ t$ of Fig. 19.
Figure 19:
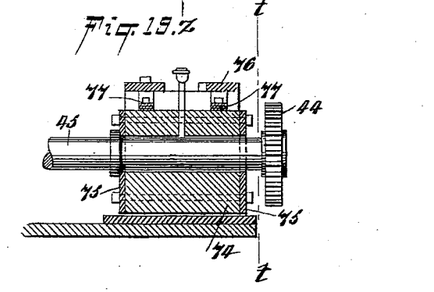
Fig. 19 is a broken longitudinal sectional elevation thereof on line $z\ z$ of Fig. 18.

In order to preserve a good engagement of the pinions 44 and the racks 43, even when the track 11 has become warped or uneven, I prefer to journal the drive-shaft 45 in a box 74, (see Figs. 18 and 19,) the box being capable of sliding up and down between bearings 78, and being pressed downward to hold the pinions 44 in engagement with the racks 43 by means of semi-elliptical or other springs 77 interposed between the top of the box 74 and cross-bars 76 connecting the tops of the bearings 78. In order to prevent any movement of the box 74 longitudinally of the shaft 45, end plates or face-plates 75 are bolted to the box, said plates at their edges overlapping the bearings 78. (See Fig. 18.)

As will be seen in Fig. 5, the racks 43 are supported on timbers 80 resting on iron beams 81, which are placed on top of timbers 82, supported on brackets 83. All these parts are located interiorly of the walls 10 of the chamber 8, so as to project from the said walls, thereby leaving a free space between the walls 10 and the sides of the car, so that the car is readily accessible for repairs when the chamber 8 has been closed by a temporary end wall and the water pumped out from said chamber. I also prefer to provide a bell-pull 84 at the front or outer end of the car, (see Figs. 3 and 4,) said bell-pull being connected to a bell in the engineer's house at the other end of the car, and being used in the same manner as the bells in the engine-room of steamboats to give a signal for starting or stopping the car.

On one side of the car or gate 7 is arranged a rack 47 arranged to engage, as the said gate is moved endwise, with the teeth of a pinion or gear-wheel 48 on a shaft 49 journaled on the top of the lock-wall 10 and having at its end a bevel-gear 50 meshing with a similar gear 51 on a vertical shaft 52 journaled in a stand 53, the upper end of said shaft 52 being provided with a lantern 54 or equivalent signal, so that said signal may be automatically actuated by the movement of the gate or car to indicate to an approaching vessel that the lock-gate is closed or opened.

Figure 10:
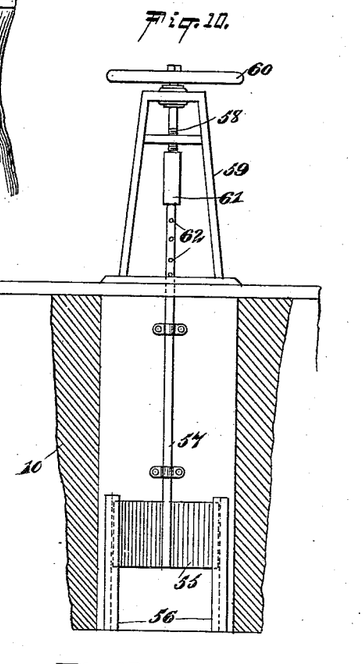
Fig. 10 is a view showing one form of wicket and its operating device.

In order to afford free circulation of water through the central water-space 9, I prefer to provide wickets at opposite ends thereof, which wickets may be constructed as shown in Fig. 10, wherein 55 represents the wicket arranged to move vertically in guides 56 and having a stem 57 provided with a screw-threaded portion engaging the correspondingly screw-threaded portion of a frame 59, and provided with a hand-wheel 60, whereby said screw-threaded portion may be turned. A sleeve 61 connects the screw-threaded portion 58 of the stem, which is rotative in said sleeve to the lower portion 57 of the stem which is non-rotative, the non-rotative portion 57 of the stem being provided with perforations 62 arranged in vertical series and adapted to be engaged by a pin or the like to engage the lower part of frame 59 to hold said wicket in a raised or lowered position. By means of these wickets a circulation of the water in space 9 may be maintained, so as to keep the same pure and fresh at all times.

Figure 11:
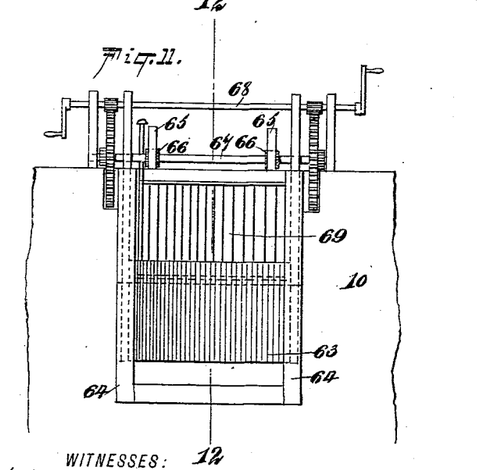
Fig. 11 is a similar view showing another form of wicket.
Figure 12:
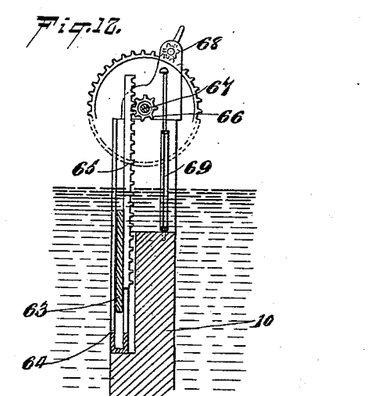
Fig. 12 is a sectional view taken in the vertical plane indicated by the line 12 12 in Fig. 11 and showing certain features of construction.

I also prefer to provide each lock with wickets at each end affording communication with the waters at opposite ends of the lock, so that water may be admitted to or drained from the lock as desired without opening the gates 7, and such wickets will be, by preference, constructed as shown in Figs. 11 and 12. As seen in said views the wicket 63 is arranged to move vertically in guides 64, and has at opposite sides rack-bars 65 engaged by spur-gears 66 on a shaft 67, the ends of which are geared to a crank-shaft 68 arranged to be operated by hand. The wicket will be preferably provided with a grid 69 to keep out drift.

Figure 13:
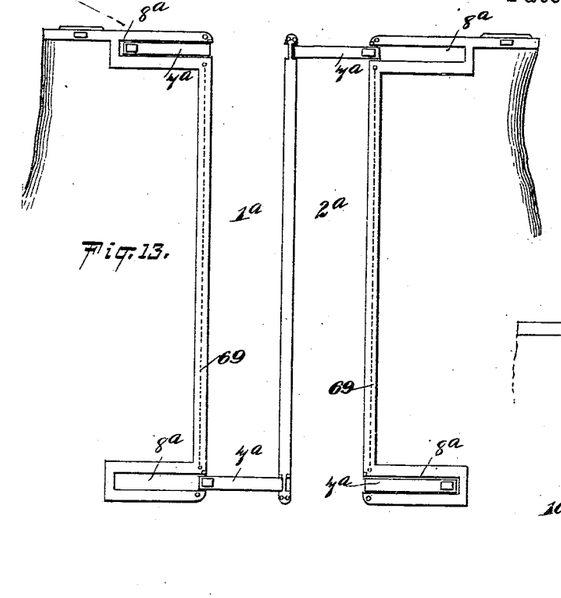
Fig. 13 is a view somewhat similar to Fig. 1, but showing a modified arrangement of the lock.

In cases where but two locks are required, the arrangement shown in Fig. 13 may be employed, wherein two locks 1$^a$ and 2$^a$ are shown separated by a single wall, the water-space 9 (shown in Fig. 1) being omitted. In this arrangement the chambers 8$^a$ are at opposite sides of opposite ends of the locks and the gates or cars 7$^a$ are arranged to move in opposite directions.

In operation, when a vessel desires to enter the harbor, one of the outer gates 7 will be opened to permit said vessel to enter one of the locks, after which the said outer gate will be closed and the inner gate opened, allowing the water from the harbor to enter the lock and raise the level of the water therein so that the vessel is permitted to proceed through the lock into the harbor without being tied up and with little if any reduction in speed.

Figure 17:
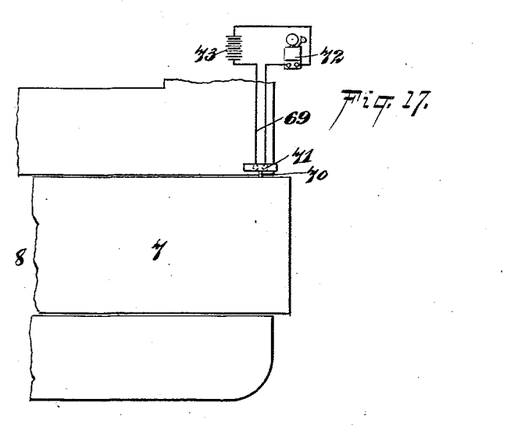
Fig. 17 is a broken plan showing the connections of a signaling device from one end of the lock to the other.

I also provide an automatic signaling device actuated by the gate or car 7 moving out of the chamber 8. Said signaling device, as illustrated by Fig. 17 and indicated in Fig. 1, comprises an electric circuit 69 extending from the chamber 8 at one end of the lock to the other end of the lock, a contact-point 70 secured to the car 7, two stationary contact-points 71 connected to the circuit 69 and so arranged that the contact-point 70 in moving outwardly with the car will close the circuit. A bell 72 is located at the opposite end of the lock to the above-described circuit-closer, and a battery 73 supplies the necessary current. It will be understood that the bell 72 will ring when the gate 7 is moved outwardly and thus inform the attendant at the other end of the lock that he has to open the gate.

The locks constructed and arranged as above described are of a comparatively simple and inexpensive nature, and although adapted for use on rivers and canals are especially well adapted for use at harbor entrances, since the construction is extremely strong and durable and permits vessels to pass the locks with little loss of time or diminution of speed.

It will also be obvious from the above description of my improvements that the invention is susceptible of considerable modification as to the form and arrangement of the various parts without material departure from the principles and spirit of my invention, and for this reason I do not wish to be understood as limiting myself to the precise construction herein set forth.

Having thus described my invention, I claim as new and desire to secure by Letters Patent—

1. A lock having a gate arranged to move transversely across it, frames at opposite sides of the lock adjacent to the ends of the gate when closed, and spring-actuated vertical drums carried in said frames with their peripheries arranged to engage the sides of the gate to close the spaces between the same and the lock-wall, substantially as set forth.

2. A lock having a gate arranged to move transversely across it, frames at opposite sides of the lock having forwardly-projecting guides, slides in said guides, vertical drums held in said slide-blocks with their peripheries arranged to engage the sides of the gate to close the spaces between the same and the lock-wall and springs for holding said drum normally pressed forward into operative position, substantially as set forth.

3. A lock having a gate arranged to move transversely across it, frames at opposite sides of the lock having forwardly-projecting portions, drums held in said forwardly-projecting portions of the frames with their peripheries arranged to engage the sides of the gate to close the spaces between the same and the lock-walls rack-teeth on the frames, and gearing comprising shafts having wheels engaging said rack-teeth for raising and lowering the frames, substantially as set forth.

4. The combination of a frame having forwardly-projecting portions at top and bottom, slide-blocks in said forwardly-projecting portions, a drum journaled in the slide-blocks, springs for holding the drum normally in operative position, and rollers under the lower slide-blocks, substantially as set forth.

5. The combination of a lock, a gate arranged to move transversely across the same, and a movable strip extending across the lock and arranged to close the space between the bottom of the lock and the gate when said gate is in its closed position, substantially as set forth.

6. The combination of a lock, a gate arranged to move transversely across the same, and a hinged strip extending across the lock with its free edge arranged to engage the gate and close the space between the same and the bottom of the lock when the gate is in its closed position, substantially as set forth.

7. The combination of a lock, a gate arranged to move transversely across the same and provided with a longitudinal recess, and a strip hinged at the bottom of the lock and extending across the same with its free edge in position to engage the recess in the gate, substantially as set forth.

8. A lock-gate having a framework comprising vertical beams united together, horizontal beams secured to the lower parts of the vertical beams, boxes held between the ends of said horizontal beams, braces connecting the ends of said horizontal beams and extending across the tops and bottoms of the boxes, and axles journaled in said boxes, substantially as set forth.

9. A lock-gate having horizontal beams, boxes between the ends thereof provided at opposite sides of their tops and bottoms with seats and braces uniting the ends of said beams and engaging said seats, substantially as set forth.

10. The combination of a wicket having a stem the upper part of which is threaded and rotative independent of the lower part, a frame threaded to receive the upper part of said stem, and means for supporting the stem when adjusted, substantially as set forth.

11. The combination of the lock, gates movable transversely at the ends thereof, an electrically-controlled signaling device at one end of the lock, a circuit from the said signaling device to the other end of the lock, and a circuit-closer actuated by the movement of the gate at the opposite end of the lock to the signaling device, substantially as set forth.

12. The combination of the lock, gates movable transversely at the ends thereof, a signaling device at one end of the lock, and an operating connection from said signaling device to the other end of the lock, said connection being controlled by the movement of the gate at the opposite end of the lock to the signaling device, substantially as described.

13. The combination of the walls of a lock, a gate arranged to move transversely across the end of the lock to close the same, and a vertical drum arranged at the side of the lock-wall in rolling contact with the side of the gate to close the space between the same and the lock-wall, substantially as set forth.

14. The combination of the walls of a lock, a gate arranged to move transversely across the end of the lock to close the same, a vertical drum arranged at the side of the lock-wall in rolling contact with the side of the gate to close the space between the same and the lock-wall, and a spring to actuate said drum, substantially as set forth.

15. The combination of a lock having a recess in its bottom, a gate arranged to move transversely across the end of the lock to close the same, and having its lower part arranged to pass through the said recess, and a strip secured in the bottom of the lock along one edge of said recess and adapted to engage the side of the gate to close the space between the same and the bottom of the lock, substantially as set forth.

16. The combination of a lock, having a recess in its bottom, a gate arranged to move transversely across the end of the lock, to close the same, and having its lower part arranged to pass through said recess, and a hinged strip arranged across the bottom of the lock at one edge of said recess and adapted to close the space between the bottom of the lock and the side of the gate, substantially as set forth.

17. The combination of a lock, a gate arranged to move transversely across the end of the lock to close the same, vertical drums arranged at the sides of the lock in rolling contact with the side of the gate to close the spaces between the same and the lock-wall, and a hinged strip arranged across the bottom of the lock and arranged to close the space between the bottom of the lock and the lower part of the gate, substantially as set forth.

18. The combination of a lock, a gate arranged to move transversely across the end of the lock to close the same, a rack carried on the gate and extending along the same parallel to the direction of movement of the gate, a signal device mounted on the lock-wall, a vertical shaft whereon said signal device is carried, a horizontal signal-shaft geared to and arranged to actuate said vertical shaft, and a pinion on said horizontal shaft and meshing with said rack on the gate, substantially as set forth.

19. The combination of the walls of a lock, a gate arranged to move transversely across the end of the lock to close the same, and a vertical drum arranged at the side of the lock-wall and adapted for rolling contact to close the space between the gate and the lock-wall, substantially as set forth.

20. The combination of a wicket having a stem the upper part of which is threaded and rotative and the lower part of which is perforated to receive a pin to hold it in a raised or lowered position, and a sleeve connecting the upper and lower parts of the stem together, substantially as set forth.

FRANKLIN HOWARD BULLIS.

Witnesses:
NATHAN HUBBELL,
FRANK K. PERKINS.